United States Patent
Sillard et al.

(10) Patent No.: US 7,327,921 B2
(45) Date of Patent: *Feb. 5, 2008

(54) CHROMATIC DISPERSION COMPENSATING OPTICAL FIBRE

(75) Inventors: Pierre Sillard, Le Chesnay (FR); Denis Molin, Draveil (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/476,803

(22) Filed: Jun. 29, 2006

(65) Prior Publication Data

US 2007/0014525 A1    Jan. 18, 2007

Related U.S. Application Data

(63) Continuation of application No. 11/157,076, filed on Jun. 21, 2005, now Pat. No. 7,095,932.

(30) Foreign Application Priority Data

Jun. 22, 2004  (FR) .................................. 04 51304

(51) Int. Cl.
G02B 6/02      (2006.01)
H04J 14/02    (2006.01)

(52) U.S. Cl. ...................... 385/123; 385/124; 385/125; 385/126; 385/127; 385/100; 398/81

(58) Field of Classification Search ........ 385/123–127, 385/100; 398/81
See application file for complete search history.

(56) References Cited

U.S. PATENT DOCUMENTS

| | | | |
|---|---|---|---|
| 6,317,552 B1 | 11/2001 | Berkey | |
| 6,483,975 B1 | 11/2002 | Hsu et al. | |
| 6,535,676 B1 | 3/2003 | De Montmorillon et al. | |
| 6,591,050 B2 * | 7/2003 | Fleury et al. | 385/123 |
| 6,650,813 B2 | 11/2003 | Jeon et al. | |
| 6,668,121 B2 | 12/2003 | Sugizaki et al. | |
| 6,819,847 B2 | 11/2004 | Matsuo et al. | |
| 6,819,850 B2 | 11/2004 | Sillard et al. | |
| 6,895,153 B2 * | 5/2005 | De Montmorillon et al. | 385/124 |
| 6,925,239 B2 | 8/2005 | Wang et al. | |
| 6,937,805 B2 | 8/2005 | Aikawa et al. | |
| 7,171,092 B2 * | 1/2007 | Montmorillon et al. | 385/127 |
| 2003/0133678 A1 | 7/2003 | Muskasa | |
| 2004/0247269 A1 | 12/2004 | Hirano et al. | |
| 2005/0185906 A1 | 8/2005 | Bickham et al. | |
| 2005/0244120 A1 | 11/2005 | Mishra | |
| 2006/0018614 A1 | 1/2006 | Wang et al. | |

FOREIGN PATENT DOCUMENTS

| | | |
|---|---|---|
| EP | 0935146 A2 | 8/1999 |
| EP | 1246380 A2 | 10/2002 |
| WO | WO 03/086997 A1 | 10/2003 |

* cited by examiner

*Primary Examiner*—Brian Healy
*Assistant Examiner*—Guy G Anderson
(74) *Attorney, Agent, or Firm*—Sughrue Mion, PLLC

(57) ABSTRACT

The invention relates to the field of chromatic dispersion compensating optical fibers for a wavelength multiplexing transmission network. A chromatic dispersion compensating optical fiber is provided having at least six core slices (1 to 6) and having a negative chromatic dispersion and chromatic dispersion slope.

14 Claims, 4 Drawing Sheets

Fig. 3

| | C | C/C' | W02 | Seff | PPC(10mm)@1625nm | Q1 |
|---|---|---|---|---|---|---|
| | ps/nm-km | nm | μm | μm² | dB/m | nm·km/ps·μm⁴ |
| N6T1 | -100 | 250 | 2.49 | 20 | <100 | 99 |
| N6T2 | -150 | 250 | 2.54 | 22 | <100 | 67 |

Fig. 2

| | $Dn1$ ×10³ | $r1a$ μm | $r1b$ μm | $r1$ μm | $Dn2$ ×10³ | $r2$ μm | $Dn3$ ×10³ | $r3$ μm | $Dn4$ ×10³ | $r4$ μm | $Dn5$ ×10³ | $r5$ μm | $Dn6$ ×10³ | $r6$ μm |
|---|---|---|---|---|---|---|---|---|---|---|---|---|---|---|
| N6T1 | 21.0 | 1.24 | 1.89 | 1.75 | -6.0 | 4.80 | 4.1 | 9.83 | -7.0 | 14.68 | 0.1 | 15.21 | -7.0 | 16.11 |
| N6T2 | 22.0 | 1.13 | 1.73 | 1.60 | -6.0 | 5.26 | 4.1 | 9.91 | -7.0 | 14.68 | 0.1 | 15.21 | -7.0 | 16.11 |

Fig. 9

| | C | C/C' | W02 | Seff | PPC(10mm)@1625nm | Q2 |
|---|---|---|---|---|---|---|
| | ps/nm-km | nm | μm | μm² | dB/m | km/ps·μm$^{1/2}$ |
| M6T1 | -95 | 166 | 2.30 | 17 | <100 | 99 |

Fig. 8

| | $Dn1$ ×10³ | $r1a$ μm | $r1b$ μm | $r1$ μm | $Dn2$ ×10³ | $r2$ μm | $Dn3$ ×10³ | $r3$ μm | $Dn4$ ×10³ | $r4$ μm | $Dn5$ ×10³ | $r5$ μm | $Dn6$ ×10³ | $r6$ μm |
|---|---|---|---|---|---|---|---|---|---|---|---|---|---|---|
| M6T1 | 23.1 | 1.12 | 1.86 | 1.69 | -6.8 | 5.02 | 5.3 | 7.87 | -6.0 | 8.37 | 9.0 | 9.05 | -6.0 | 9.93 |

Fig. 5

| | C | C/C' | r1b | r1 | w02 | Seff | PPC(10mm) @1625nm |
|---|---|---|---|---|---|---|---|
| | ps/nm·km | nm | μm | μm | μm | μm² | dB/m |
| N8T1 | -.68 | 250 | 1.82 | 2.64 | | 23 | <100 |
| N8T2 | -.150 | 250 | 1.86 | 2.65 | | 25 | <100 |

Fig. 4

| | Dn1 x10³ | r1a μm | Dn2 x10³ | r2 μm | Dn3 x10³ | r3 μm | Dn4 x10³ | r4 μm | Dn5 x10³ | r5 μm | Dn6 x10³ | r6 μm | Dn7 x10³ | r7 μm | Dn8 x10³ | r8 μm | Q1 nm·km/ps·μm⁴ |
|---|---|---|---|---|---|---|---|---|---|---|---|---|---|---|---|---|---|
| N8T1 | 16.9 | 1.82 | -6.3 | 5.34 | 7.0 | 7.78 | -5.2 | 8.17 | 2.0 | 9 | -4.0 | 9.82 | 2.0 | 10.5 | -4.0 | 11.5 | 84 |
| N8T2 | 20.0 | 1.22 | -6.0 | 5.41 | 4.2 | 10.32 | -7.0 | 14.68 | 0.1 | 15.21 | -7.0 | 16.11 | 5.0 | 16.71 | -6.0 | 17.34 | 50 |

Fig. 11

| | C | C/C' | r1b | r1 | w02 | Seff | PPC(10mm) @1625nm |
|---|---|---|---|---|---|---|---|
| | ps/nm·km | nm | μm | μm | μm | μm² | dB/m |
| M8T1 | -.95 | 166 | 1.92 | 1.74 | 2.35 | 18 | <100 |
| M8T2 | -.150 | 166 | 1.72 | 1.57 | 2.29 | 17 | <100 |

Fig. 10

| | Dn1 x10³ | r1a μm | Dn2 x10³ | r2 μm | Dn3 x10³ | r3 μm | Dn4 x10³ | r4 μm | Dn5 x10³ | r5 μm | Dn6 x10³ | r6 μm | Dn7 x10³ | r7 μm | Dn8 x10³ | r8 μm | Q2 km/ps·μm^{1/2} |
|---|---|---|---|---|---|---|---|---|---|---|---|---|---|---|---|---|---|
| M8T1 | 22.0 | 1.15 | -6.8 | 5.33 | 6.7 | 7.90 | -5.8 | 8.55 | 8.9 | 9.29 | -7.0 | 10.50 | 0.0 | 10.99 | -7.0 | 12.11 | 93 |
| M8T2 | 25.4 | 1.03 | -6.8 | 5.31 | 7.8 | 7.86 | -5.5 | 8.53 | 5.7 | 9.18 | -5.9 | 10.34 | 4.9 | 10.73 | -6.3 | 11.57 | 71 |

Fig. 7

| | C | C/C' | W02 | Seff | PPC(10mm)@1625nm | Q1 |
|---|---|---|---|---|---|---|
| | ps/nm-km | nm | μm | μm² | dB/m | nm-km/ps-μm⁴ |
| N10T1 | -.70 | 250 | 2.71 | 24.4 | <100 | 70 |

Fig. 6

| | Dn1 | r1a | r2a | r1 | Dn2 | r2 | Dn3 | r3 | Dn4 | r4 | Dn5 | r5 | Dn6 | r6 | Dn7 | r7 | Dn8 | r8 | Dn9 | r9 | Dn10 | r10 |
|---|---|---|---|---|---|---|---|---|---|---|---|---|---|---|---|---|---|---|---|---|---|---|
| | $\times 10^{-3}$ | μm | μm | μm | $\times 10^{-3}$ | μm | $\times 10^{-3}$ | μm | $\times 10^{-3}$ | μm | $\times 10^{-3}$ | μm | $\times 10^{-3}$ | μm | $\times 10^{-3}$ | μm | $\times 10^{-3}$ | μm | $\times 10^{-3}$ | μm | $\times 10^{-3}$ | μm |
| N10T1 | 16.1 | 1.89 | 1.89 | 1.89 | -6.4 | 5.41 | 7.1 | 7.74 | -5.1 | 8.08 | 2.2 | 9.04 | -3.9 | 9.43 | 2.1 | 10.2 | -4.0 | 11.1 | 2.0 | 11.52 | -4.1 | 12.5 |

Fig. 13

| | C | C/C' | W02 | Seff | PPC(10mm)@1625nm | Q2 |
|---|---|---|---|---|---|---|
| | ps/nm-km | nm | μm | μm² | dB/m | km/ps-μm$^{1/2}$ |
| M10T1 | 150 | 166 | 2.3 | 17 | <100 | 71 |

Fig. 12

| | Dn1 | r1a | r2a | r1 | Dn2 | r2 | Dn3 | r3 | Dn4 | r4 | Dn5 | r5 | Dn6 | r6 | Dn7 | r7 | Dn8 | r8 | Dn9 | r9 | Dn10 | r10 |
|---|---|---|---|---|---|---|---|---|---|---|---|---|---|---|---|---|---|---|---|---|---|---|
| | $\times 10^{-3}$ | μm | μm | μm | $\times 10^{-3}$ | μm | $\times 10^{-3}$ | μm | $\times 10^{-3}$ | μm | $\times 10^{-3}$ | μm | $\times 10^{-3}$ | μm | $\times 10^{-3}$ | μm | $\times 10^{-3}$ | μm | $\times 10^{-3}$ | μm | $\times 10^{-3}$ | μm |
| M10T1 | 25.4 | 1.02 | 1.71 | 1.56 | -6.8 | 5.00 | 5.8 | 7.86 | -5.9 | 8.34 | 5.2 | 9.46 | -6.0 | 10.30 | 5.0 | 10.82 | -6.2 | 12.09 | 4.9 | 12.68 | -6.2 | 13.79 |

CHROMATIC DISPERSION COMPENSATING OPTICAL FIBRE

This is a continuation of application Ser. No. 11/157,076 filed Jun. 21, 2005 now U.S. Pat. No. 7,095,932. The entire disclosure of the prior application, application Ser. No. 11/157,076 is considered part of the disclosure of the accompanying continuation application and is hereby incorporated by reference.

The invention relates to the field of chromatic dispersion compensating optical fibers for avelength multiplexing transmission networks.

According to the prior art, a dispersion compensating optical fiber, for a group of optical properties such as the chromatic dispersion, the chromatic dispersion slope and the effective surface, has a central slice whose maximum index is very high, essentially in order to ensure a high absolute value for negative chromatic dispersion of the chromatic dispersion compensating optical fiber.

To improve the total compromise between on one hand the group of optical properties of the chromatic dispersion compensating optical fiber and on the other hand its cost, essentially related to the difficulty and complexity of its fabrication process, the invention proposes to modify the balance between the difficulty of the process and the complexity of the process. It is indeed proposed by the invention to add core slices to the chromatic dispersion compensating optical fiber of a line optical fiber, to increase the number of core slices of a dispersion compensating optical fiber from four to at least six, what certainly increases the complexity of the process by adding at least two slices but at the same facilitates this process since it enables a considerable reduction in the maximum doping value of the central slice making it easier to fabricate. The chromatic dispersion compensating optical fiber may in fact have more slices but these are in total easier to produce. By increasing the number of slices while reducing the maximum value of the doping level of the central slice it is possible to reduce the attenuation and the polarisation mode dispersion while increasing the effective surface area, which relates to a better total compromise between the group of optical properties of the chromatic dispersion compensating optical fiber according to the invention.

According to the invention, a single-mode chromatic dispersion compensating optical fiber is provided for a wavelength multiplexing transmission network, having a chromatic dispersion C at a central wavelength of the spectral band used which is less than −50 ps/nm-km, having a chromatic dispersion slope C' at said central wavelength which is negative, having a ratio of chromatic dispersion to the chromatic dispersion slope C/C' at said central wavelength which is less than 600 nm, and successively comprising, from the center towards the periphery, a core having a variable index profile and then a cladding of constant index, characterized in that the variable index profile of the core comprises at least six slices among which successively, from the center towards the periphery, a central slice whose maximum index is greater than the index of the cladding, the difference Dn1 between the maximum index of the central slice and the index of the cladding being greater than $13.10^{-3}$, a first buried slice whose minimum index is lower than the index of the cladding, the difference Dn2 between the minimum index of the first buried slice and the index of the cladding being less than $-4.10^{-3}$, a first annular slice whose maximum index is greater than the index of the cladding and less than the maximum index of the central slice, the difference Dn3 between the maximum index of the first annular slice and the index of the cladding being greater than $2.5.10^{-3}$, a second buried slice whose minimum index is lower than the index of the cladding, the difference Dn4 between the minimum index of the second buried slice and the index of the cladding being less than $-2.10^{-3}$, a second annular slice whose maximum index is greater than the index of the cladding and less than the maximum index of the central slice, the difference Dn5 between the maximum index of the second annular slice and the index of the cladding being greater than $2.10^{-3}$, a third buried slice whose minimum index is lower than the index of the cladding, the difference Dn6 between the minimum index of the third buried slice and the index of the cladding being less than $-1.10^{-3}$. The choice of a maximum threshold for the ratio between chromatic dispersion and chromatic dispersion slope allows for efficient compensation of a line optical fiber in a wavelength multiplexing optical transmission system. This ratio is preferably chosen to be less than 500 nm, even advantageously less than 400 nm, at the central wavelength of the spectral band used. A spectral band used is generally at least one of the spectral bands S, C, L and U in which one or more optical signals are conveyed by the line optical fiber and by the chromatic dispersion compensating optical fiber. The spectral band S extends from approximately 1465 nm to 1530 nm, the spectral band C extends from approximately 1530 nm to 1570 nm, the spectral band L extends from approximately 1570 nm to 1625 nm, the spectral band U extends from approximately 1625 nm to 1675 nm.

Preferably, for further improvement in the total compromise between the group of optical properties, one or more or all the index differences of the six first slices are more pronounced. The difference Dn1 between the maximum index of the central slice and the index of the cladding may advantageously be greater than $15.10^{-3}$. The difference Dn2 between the minimum index of the first buried slice and the index of the cladding may advantageously be less than $-5.10^{-3}$. The difference Dn3 between the maximum index of the first annular slice and the index of the cladding may advantageously be greater than $3.10^{-3}$. The difference Dn4 between the minimum index of the second buried slice and the index of the cladding may advantageously be less than $-3.10^{-3}$. The difference Dn5 between the maximum index of the second annular slice and the index of the cladding may advantageously be greater than $2.5.10^{-3}$. The difference Dn6 between the minimum index of the third buried slice and the index of the cladding may advantageously be less than $-2.10^{-3}$.

In order to further improve the total compromise between the group of optical properties of the chromatic dispersion compensating optical fiber, the invention proposes two quality factors, the first quality factor adapted to a chromatic dispersion compensating optical fiber intended to compensate a standard single mode optical fiber (SSMF) which corresponds to a ratio between chromatic dispersion and chromatic dispersion slope that is relatively high, typically between 250 nm and 400 nm, and the second quality factor being adapted to a chromatic dispersion compensating optical fiber intended to compensate a non-zero dispersion shifted line optical fiber (NZ-DSF) which corresponds to a ratio between chromatic dispersion and chromatic dispersion slope that is relatively low, typically less than 200 nm.

In a first preferred embodiment, to compensate a standard single mode line optical fiber, having a central slice with a radius $r_1$ and a first buried slice with a radius $r_2$, the chromatic dispersion compensating optical fiber has a first quality factor Q1 that is positive and less than 90 nm-km/ps-µm⁴, wherein:

$$Q1 = -4800 \frac{(Dn1 - Dn2)^{3/2}}{C \cdot (r_1)^2 \cdot (r_2)^2}$$

the radii $r_1$ and $r_2$ being expressed in µm, the chromatic dispersion C being expressed in ps/nm-km, the index differences Dn1 and Dn2 being expressed without unit but multiplied by a factor of one thousand. In an even more advantageous embodiment, the first quality factor Q1 is positive and less than 80 nm-km/ps-µm⁴, even positive and less than 70 nm-km/ps-µm⁴, even positive and less than 60 nm-km/ps-µm⁴.

In a second preferred embodiment, to compensate a non-zero dispersion shifted line optical fiber in the spectral band used, having a central slice with a radius $r_1$ and a first burried slice with a radius $r_2$, the chromatic dispersion compensating optical fiber has a second quality factor Q2 that is positive and less than 100 km/ps-µm$^{1/2}$, wherein:

$$Q2 = 12800 \frac{Dn1 \cdot Dn2 \cdot C'}{(r_1)^{1/2} \cdot (C)^2}$$

the radius $r_1$ being expressed in µm, the chromatic dispersion C being expressed in ps/nm-km, the chromatic dispersion slope C' being expressed in ps/nm²-km, the index differences Dn1 and Dn2 being expressed without unit but multiplied by a factor of one thousand. In a further advantageous embodiment the second quality factor Q2 is positive and less than 90 km/ps-µm$^{1/2}$, even positive and less than 80 km/ps-µm$^{1/2}$.

In one embodiment the chromatic dispersion compensating optical fiber of the invention has a variable index profile of the core which successively comprises, from the center towards the periphery, at least eight slices among which a third annular slice whose maximum index is greater than the index of the cladding and less than the maximum index of the central slice, a fourth burried slice whose minimum index is less than the index of the cladding.

In a further embodiment, the chromatic dispersion compensating optical fiber of the invention has a variable index profile of the core which successively comprises, from the center towards the periphery, at least ten slices among which a fourth annular slice whose maximum index is greater than the index of the cladding and less than the maximum index of the central slice, a fifth burried slice whose minimum index is less than the index of the cladding.

Preferably, for even further improved efficiency in chromatic dispersion compensation of the line optical fiber, the chromatic dispersion compensating optical fiber of the invention has a chromatic dispersion which is less than −80 ps/nm-km, even less than −120 ps/nm-km.

The invention also concerns a chromatic dispersion compensating module comprising at least one chromatic dispersion compensating optical fiber according to the invention. The first and second quality factors are particularly well adapted to dispersion compensating optical fibers (DCF) intended to be placed in a module, which corresponds to a rather negative dispersion, i.e. typically less than −50 ps/nm-km, in contrast to dispersion compensating optical fibers intended to be placed in a cable (reverse dispersion fiber: RDF) which corresponds to a moderately negative dispersion, i.e. typically between −10 ps/nm-km and −50 ps/nm-km.

The invention will be better understood and other characteristics and advantages will become apparent on reading the following description and its appended drawings given as examples in which:

FIG. 1 is a diagram showing an example of a profile type having ten slices of a chromatic dispersion compensating optical fiber according to the invention, FIG. 2 is a table giving the values for the radii and index differences for two examples of profiles with six slices of a chromatic dispersion compensating optical fiber according to the invention, intended to compensate a standard single mode optical fiber;

FIG. 3 is table giving certain characteristics of profiles of chromatic dispersion compensating optical fibers according to the invention defined in FIG. 2;

FIG. 4 is a table giving the values of the radii and index differences for two examples of profiles having eight slices of a chromatic dispersion compensating optical fiber according to the invention, intended to compensate a standard single mode optical fiber;

FIG. 5 is a table giving certain profile characteristics of a chromatic dispersion compensating optical fiber according to the invention defined in FIG. 4;

FIG. 6 is a table giving the values of the radii and index differences for an example of a profile having ten slices of a chromatic dispersion compensating optical fiber according to the invention, intended to compensate a standard single mode optical fiber;

FIG. 7 is a table giving certain characteristics of profiles of a chromatic dispersion compensating optical fiber according to the invention as defined in FIG. 6;

FIG. 8 is a table giving the values of the radii and index differences of two examples of profiles having six slices of a chromatic dispersion compensating optical fiber according to the invention, intended to compensate a non-zero dispersion shifted optical fiber in the spectral band used;

FIG. 9 is a table giving certain characteristics of profiles of the chromatic dispersion compensating optical fiber according to the invention defined in FIG. 8;

FIG. 10 is a table comprising values of the radii and index differences of two examples of profiles having eight slices of a chromatic dispersion compensating optical fiber according to the invention, intended to compensate a non-zero dispersion shifted optical fiber in the spectral band used;

FIG. 11 is a table giving certain characteristics of profiles of a chromatic dispersion compensating optical fiber according to the invention as defined in FIG. 10;

FIG. 12 is a table giving values of the radii and index differences for an example of a profile having ten slices of a chromatic dispersion compensating optical fiber according to the invention, intended to compensate a non-zero dispersion shifted optical fiber in the spectral band used;

FIG. 13 is a table giving certain characteristics of profiles of a chromatic dispersion compensating optical fiber according to the invention as defined in FIG. 12.

Figure 1:
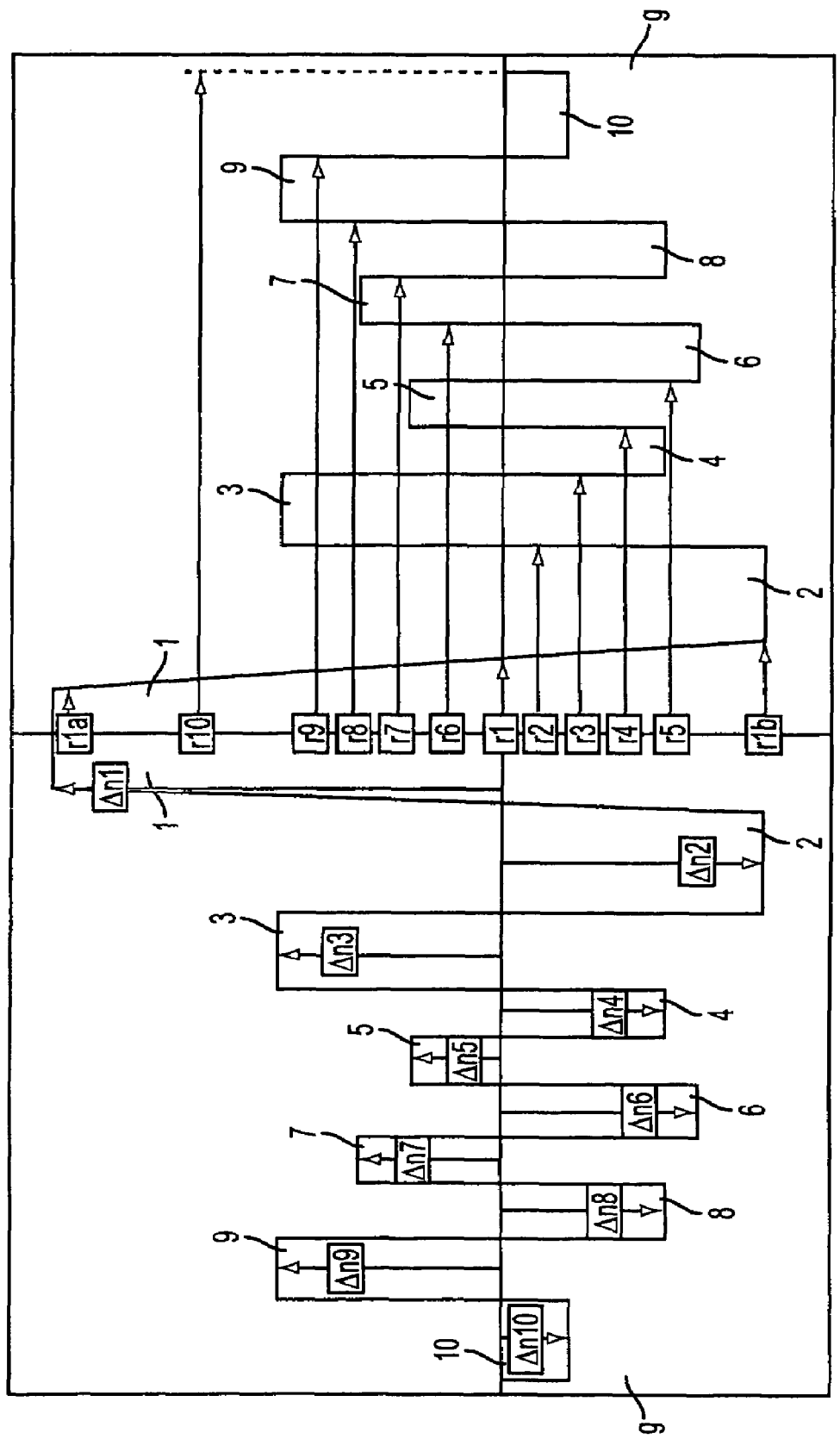

FIG. 1 schematically shows an example of a profile type having ten slices of a chromatic dispersion compensating optical fiber according to the invention. For a trapezoid shape, the first slice 1, called central slice, has a maximum index difference Dn1 with the constant index of the cladding and an outer radius r1b. The maximum index difference Dn1 is positive. The maximum index difference of a slice corresponds firstly for the central slice and the annular slices to the difference between the maximum index of the slice and the constant index of the cladding, and secondly for the burried slices to the difference between the minimum index of the slice and the constant index of the cladding. Preferably, between a zero radius and the radius r1a the index is constant and maximum, it becomes equal to that of the cladding for a value r1 of the radius and reaches that of the second slice for a value r1b. With a rectangular shape, the first slice, called central slice, has a maximum index difference Dn1 with the constant index of the cladding and an outer radius r1: in this case r1a=r1=r1b. The maximum index difference Dn1 is positive. Preferably, between a zero radius and the radius r1 the index is constant. The central slice, like every other annular or burried slice may have various shapes including rectangular, trapezoid, alpha, irregular or any other shape or even consist of several pieces (each piece possibly having any shape) some with a positive index and others with a negative index, provided that each of these slices respects the definition corresponding to it in claim 1. The second slice 2, called first burried slice, has a maximum index difference Dn2 with the constant index of the cladding and an outer radius r2. The maximum index difference Dn2 is negative. Preferably, between radius r1 and radius r2 the index is constant. The third slice 3, called first annular slice, has a maximum index difference Dn3 with the constant index of the cladding and an outer radius r3. The maximum index difference Dn3 is positive. Preferably, between radius r2 and radius r3 the index is constant. The fourth slice 4, called second burried slice, has a maximum index difference Dn4 with the constant index of the cladding and an outer radius r4. The maximum index difference Dn4 is negative. Preferably, between radius r3 and radius r4 the index is constant. The fifth slice 5, called second annular slice, has a maximum index difference Dn5 with the constant index of the cladding and an outer radius r5. The maximum index difference Dn5 is positive. Preferably, between radius r4 and radius r5 the index is constant. The sixth slice 6, called third burried slice, has a maximum index difference Dn6 with the constant index of the cladding and an outer radius r6. The maximum index difference Dn6 is negative. Preferably, between radius r5 and radius r6 the index is constant. The seventh slice 7, called third annular slice, has a maximum index difference Dn7 with the constant index of the cladding and an outer radius r7. The maximum index difference Dn7 is positive. Preferably, between radius r6 and radius r7 the index is constant. The eighth slice 8, called fourth burried slice, has a maximum index difference Dn8 with the constant index of the cladding and an outer radius r8. The maximum index difference Dn8 is negative. Preferably, between radius r7 and radius r8 the index is constant. The ninth slice 9, called fourth annular slice, has a maximum index difference Dn9 with the constant index of the cladding and an outer radius r9. The maximum index difference Dn9 is positive. Preferably, between radius r8 and radius r9 the index is constant. The tenth slice 10, called fifth burried slice, has a maximum index difference Dn10 with the constant index of the cladding and an outer radius r10. The maximum index difference Dn10 is negative. Preferably, between radius r9 and radius r10 the index is constant. The cladding g of constant index is found beyond radius r10. An optical fiber whose core has only eight slices corresponds to the case in which Dn10=Dn9=0 and r10=r9=r8. An optical fiber whose core has only six slices corresponds to the case in which Dn10=Dn9=Dn8=Dn7=0 and r10=r9=r8=r7=r6. The core of the optical fiber preferably has an even number of slices even though it may possibly have 7, 9, 11 or more slices.

FIG. 2 is a table giving values of radii and index differences for two examples of profiles having six slices of a chromatic dispersion compensating optical fiber of the invention intended to compensate a standard single mode optical fiber. The left column comprises the denomination of examples N6T1 and N6T2. The next column expresses one thousand times the index difference Dn1 (without unit). The next column expresses in μm the radius r1a of the variable index profile of the core. The next column expresses in μm the radius r1 of the variable index profile of the core. The next column expresses in μm the radius r1b of the variable index profile of the core. The next column expresses one thousand times the index difference Dn2 (without unit). The next column expresses in μm the radius r2 of the variable index profile of the core. The next column expresses one thousand times the index difference Dn3 (without unit). The next column expresses in μm radius r3 of the variable index profile of the core. The next column expresses one thousand times the index difference Dn4 (without unit). The next column expresses in μm the radius r4 of the variable index profile of the core. The next column expresses one thousand times the index difference Dn5 (without unit). The next column expresses in μm the radius r5 of the variable index profile of the core. The next column expresses one thousand times the index difference Dn6 (without unit). The next column expresses in μm the radius r6 of the variable index profile of the core.

FIG. 3 is a table giving certain profile characteristics of a chromatic dispersion compensating optical fiber of the invention as defined in FIG. 2. The left column compromises the denomination of examples N6T1 an N6T2. For each example considered, the other columns represent characteristics of the optical fiber corresponding to the example under consideration. The next column gives the chromatic dispersion C expressed in ps/nm-km at a wavelength of 1550 nm. The spectral band used is the C spectral band extending from approximately 1530 nm to 1570 nm. The next column gives the ratio between the chromatic dispersion C and the chromatic dispersion slope C' expressed in nm at a wavelength of 1550 nm. The next column gives the radius of the W02 mode according to the definition of Petermann II, expressed in μm, at a wavelength of 1550 nm. The next column gives the effective surface area $S_{\mathit{eff}}$ expressed in μm² at a wavelength of 1550 nm. The next column gives a maximum bending loss threshold expressed in dB/m at the wavelength of 1625 nm when wound around a sleeve having a radius of 10 mm. The next column gives the value of the first quality factor Q1 expressed in nm-km/ps-μm⁴.

FIG. 4 is a table giving the values of radii and index differences for two examples of profiles having eight slices of a chromatic dispersion compensating optical fiber of the invention intended to compensate a standard single mode optical fiber. The description of FIG. 4 is similar to the description of FIG. 2 except that it comprises two additional slices for the variable core profile and different example numbers.

FIG. 5 is a table giving certain profile characteristics of a chromatic dispersion compensating optical fiber according to the invention as defined in FIG. 4. The description of FIG. 5 is similar to the description of FIG. 3.

FIG. 6 is a table giving the values of radii and index differences for an example of a profile having ten slices of a chromatic dispersion compensating optical fiber of the invention, intended to compensate a standard single mode optical fiber. The description of FIG. 6 is similar to the description of FIG. 2 except that it comprises four additional slices for the variable core profile and different example numbers.

FIG. 7 is a table giving certain profile characteristics of a chromatic dispersion compensating optical fiber according to the invention as defined in FIG. 6. The description of FIG. 7 is similar to the description of FIG. 3.

FIG. 8 is a table giving values of radii and index differences for an example of a profile having six slices of a chromatic dispersion compensating optical fiber of the invention intended to compensate a non-zero shifted dispersion optical fiber in the spectral band used. The left column comprises the denomination of example M6T1. The next column expresses one thousand times the index difference Dn1 (without unit). The next column expresses in μm the radius r1 of the variable index profile of the core. The next column expresses in μm the radius r1b of the variable index profile of the core. The next column expresses one thousand times the index difference Dn2 (without unit). The next column expresses in μm the radius r2 of the variable index profile of the core. The next column expresses one thousand times the index difference Dn3 (without unit). The next column expresses in μm the radius r3 of the variable index profile of the core. The next column expresses one thousand times the index difference Dn4 (without unit). The next column expresses in μm the radius r4 of the variable index profile of the core. The next column expresses one thousand times the index difference Dn5 (without unit). The next column expresses in μm the radius r5 of the variable index profile of the core. The next column expresses one thousand times the index difference Dn6 (without unit). The next column expresses in μm the radius r6 of the variable index profile of the core.

FIG. 9 is a table giving certain profile characteristics of a chromatic dispersion compensating optical fiber according to the invention as defined in FIG. 8. The left column comprises the denomination of example M6T1. For each example considered the other columns represent characteristics of the optical fiber corresponding to the example under consideration. The next column gives the chromatic dispersion C expressed in ps/nm-km at a wavelength of value 1550 nm. The spectral band used is the C spectral band extending from approximately 1530 nm to 1570 nm. The next column gives the ratio between chromatic dispersion C and chromatic dispersion slope C' expressed in nm at a wavelength of 1550 nm. The next column gives the radius of the W02 mode according to the definition of Petermann II, expressed in μm, at a wavelength of 1550 nm. The next column gives the effective surface area $S_{eff}$ expressed in μm$^2$ at the wavelength of 1550 nm. The next column gives a maximum bending loss threshold expressed in dB/m at a wavelength of 1625 nm when connected to a sleeve having a radius of 10 nm. The next column gives the value of the second quality factor Q2 expressed in km/ps-μm$^{1/2}$.

FIG. 10 is a table giving values of radii and index differences for two examples of profiles having eight slices of a chromatic dispersion compensating optical fiber of the invention intended to compensate a non-zero shifted dispersion optical fiber in the spectral band used. The description of FIG. 10 is similar to the description of FIG. 8 except that it comprises two additional slices for the variable index profile of the core and different example numbers.

FIG. 11 is a table giving certain profile characteristics of a chromatic dispersion compensating optical fiber of the invention as defined in FIG. 10. The description of FIG. 11 is similar to the description of FIG. 9.

FIG. 12 is a table giving the values of radii and index differences for an example of a profile having ten slices of a chromatic dispersion compensating optical fiber of the invention intended to compensate a non-zero shifted dispersion optical fiber in the spectral band used. The description of FIG. 12 is similar to the description of FIG. 8 except that it comprises four additional slices for the variable index profile of the core and different example numbers.

FIG. 13 is a table giving certain profile characteristics of a chromatic dispersion compensating optical fiber of the invention as defined in FIG. 12. The description of FIG. 13 is similar to the description of FIG. 9.

What is claimed is:

1. A single-mode chromatic dispersion compensating optical fiber for a wavelength multiplexing transmission network, comprising:
    a chromatic dispersion C at a central wavelength of a spectral band used which is less than −50 ps/nm-km,
    a chromatic dispersion slope C' at said central wavelength which is negative,
    a ratio of chromatic dispersion to chromatic dispersion slope C/C' at said central wavelength which is less than 600 nm, and
    a core having a variable index profile of at least six slices (1 to 6) among which successively from the center towards the periphery,
    a central slice (1),
    a first burried slice (2),
    a first annular slice (3) whose maximum index less than a maximum index of the central slice,
    a second burried slice (4),
    a second annular slice (5) whose maximum index is less than a maximum index of the central slice, and
    a third burried slice (6).

2. The chromatic dispersion compensating optical fiber according to claim 1, wherein the chromatic dispersion compensating optical fiber compensates a standard single-mode line optical fiber, and in that the central slice has a radius r1 and the first burned slice has a radius $r_2$, the optical fiber having a first quality factor Q1 that is positive and less than 90 nm-km/ps-ÿm$^4$, wherein:
    the radii $r_1$ and $r_2$ being expressed in ÿm, the chromatic dispersion C being expressed in ps/nm-km, the index differences Dn1 and Dn2 being expressed without unit but multiplied by a factor of one thousand.

3. The chromatic dispersion compensating optical fiber according to claim 2, wherein the optical fiber has a first quality factor Q1 that is positive and less than 80 nm-km/ps-ÿm$^4$.

4. The chromatic dispersion compensating optical fiber according to claim 3, wherein the optical fiber has a first quality factor Q1 that is positive and less than 70 nm-km/ps-ÿm$^4$.

5. The chromatic dispersion compensating optical fiber according to claim 4, wherein the optical fiber has a first quality factor Q1 that is positive and less than 60 nm-km/ps-ÿm$^4$.

6. The chromatic dispersion compensating optical fiber according to claim 1, wherein the chromatic dispersion compensating optical fiber is intended to compensate a non-zero dispersion shifted line optical fiber in the spectral band used and in that the central slice has a radius r$^1$, the optical fiber having a second quality factor Q2 that is positive and less than 100 km/ps-ÿm$_{1/2}$, wherein:
    the radius $r_1$ being expressed in ÿm, the chromatic dispersion C being expressed in ps/nm$^2$-km, the index differences Dn1 and Dn2 being expressed without unit but multiplied by a factor of one thousand.

7. The chromatic dispersion compensating optical fiber according to claim 6, wherein the optical fiber has a second quality factor Q2 that is positive and less than 90km/ps-ÿm$^{1/2}$.

8. The chromatic dispersion compensating optical fiber according to claim 7, wherein the optical fiber has a second quality factor Q2 that is positive and less than 80 km/ps-ÿm$^{1/2}$.

9. The chromatic dispersion compensating optical fiber according to claim 1, wherein the variable index profile of the core successively comprises, from the center towards the periphery, at least eight slices among which a third annular slice (7) whose maximum index is less than the maximum index of the central slice, and a fourth hurried slice (8).

10. The chromatic dispersion compensating optical fiber according to claim 9, wherein the variable index profile of the core successively comprises, from the center towards the periphery, at least ten slices among which a fourth annular slice (9) whose maximum index is less than the maximum index of the central slice, and a fifth hurried slice (10).

11. The chromatic dispersion compensating optical fiber according to claim 1, wherein chromatic dispersion is less than −80 ps/nm-km.

12. The chromatic dispersion compensating optical fiber according to claim 1, wherein the chromatic dispersion is less than −120 ps/nm-km.

13. A chromatic dispersion compensating module comprising at least one chromatic dispersion compensating optical fiber according to claim 1.

14. A single-mode chromatic dispersion compensating optical fiber for a wavelength multiplexing transmission network, comprising:

a chromatic dispersion C at a central wavelength of a spectral band used which is less than −50 ps/nm-km, a chromatic dispersion slope C' at said central wavelength which is negative, a ratio of chromatic dispersion to chromatic dispersion slope C/C' at said central wavelength which is less than 600 nm, and successively comprising, from a center towards a periphery, a core having a variable index profile, and then a cladding of constant index, wherein said core comprises:

a variable index profile of at least six slices (1 to 6) among which successively from the center towards the periphery, a central slice (1), a first burned slice (2), a first annular slice (3) whose maximum index less than a maximum index of the central slice, a second burned slice (4), a second annular slice (5) whose maximum index is less than a maximum index of the central slice, and a third burned slice (6).

* * * * *